United States Patent
Ghosh et al.

(10) Patent No.: US 9,446,389 B2
(45) Date of Patent: Sep. 20, 2016

(54) HYDROCARBON AROMATIZATION CATALYST COMPOSITION AND METHOD OF FORMATION

(71) Applicant: SAUDI BASIC INDUSTRIES CORPORATION, Riyadh (SA)

(72) Inventors: Ashim Kumar Ghosh, Houston, TX (US); Scott Stevenson, Houston, TX (US); David Sullivan, Sugar Land, TX (US); Corina Mihut, Sugar Land, TX (US); Neeta Kulkarni, Houston, TX (US); Meghann Simmons, Katy, TX (US); Michael Mier, Waller, TX (US)

(73) Assignee: SAUDI BASIC INDUSTRIES CORPORATION, Riyadh (SA)

( * ) Notice: Subject to any disclaimer, the term of this patent is extended or adjusted under 35 U.S.C. 154(b) by 426 days.

(21) Appl. No.: 14/105,941

(22) Filed: Dec. 13, 2013

(65) Prior Publication Data
US 2015/0165424 A1 Jun. 18, 2015

(51) Int. Cl.

| | |
|---|---|
| *B01J 29/44* | (2006.01) |
| *B01J 37/04* | (2006.01) |
| *B01J 37/30* | (2006.01) |
| *B01J 21/08* | (2006.01) |
| *B01J 29/04* | (2006.01) |
| *B01J 35/00* | (2006.01) |
| *B01J 35/02* | (2006.01) |
| *B01J 37/00* | (2006.01) |
| *B01J 37/02* | (2006.01) |
| *C10G 35/095* | (2006.01) |
| *C10G 35/09* | (2006.01) |
| *C10G 45/70* | (2006.01) |
| *C10G 3/00* | (2006.01) |

(52) U.S. Cl.
CPC ............... *B01J 29/44* (2013.01); *B01J 21/08* (2013.01); *B01J 29/047* (2013.01); *B01J 35/0013* (2013.01); *B01J 35/023* (2013.01); *B01J 37/0009* (2013.01); *B01J 37/0018* (2013.01); *B01J 37/0201* (2013.01); *B01J 37/0207* (2013.01); *B01J 37/04* (2013.01); *B01J 37/30* (2013.01); *C10G 3/44* (2013.01); *C10G 3/49* (2013.01); *C10G 3/57* (2013.01); *C10G 3/60* (2013.01); *C10G 35/09* (2013.01); *C10G 35/095* (2013.01); *C10G 45/70* (2013.01); *B01J 2229/186* (2013.01); *B01J 2229/40* (2013.01); *B01J 2229/42* (2013.01); *C10G 2300/104* (2013.01); *C10G 2300/1044* (2013.01); *C10G 2400/30* (2013.01); *Y02P 30/20* (2015.11)

(58) Field of Classification Search
None
See application file for complete search history.

(56) References Cited

U.S. PATENT DOCUMENTS

| | | |
|---|---|---|
| 3,702,886 A | 11/1972 | Argauer et al. |
| 5,227,557 A | 7/1993 | Bournonville et al. |
| 6,784,333 B2 | 8/2004 | Juttu et al. |
| 7,029,650 B1 | 4/2006 | Juttu et al. |
| 7,902,413 B2 | 3/2011 | Stevenson et al. |
| 2002/0115555 A1* | 8/2002 | van den Berge ........ B01J 29/40 502/61 |
| 2008/0255398 A1 | 10/2008 | Stevenson et al. |
| 2008/0293987 A1 | 11/2008 | Khanmamedova et al. |
| 2009/0209795 A1 | 8/2009 | Lauritzen et al. |
| 2010/0048969 A1 | 2/2010 | Lauritzen et al. |
| 2011/0132804 A1 | 6/2011 | Stevenson et al. |
| 2013/0068663 A1 | 3/2013 | Beeckman et al. |
| 2013/0296625 A1* | 11/2013 | Ghosh ................... B01J 29/047 585/417 |

OTHER PUBLICATIONS

International Search Report for International Application No. PCT/US2014/069763; International Filing Date Dec. 11, 2014; Date of Mailing Jun. 1, 2015; 4 pages.
Written Opinion of the International Search Report for International Application No. PCT/US2014/069763; International Filing Date Dec. 11, 2014; Date of Mailing Jun. 1, 2015; 6 pages.

* cited by examiner

*Primary Examiner* — Melvin C Mayes
*Assistant Examiner* — Stefanie Cohen
(74) *Attorney, Agent, or Firm* — Cantor Colburn LLP

(57) ABSTRACT

A method for forming a catalyst can comprise: heating a Ge-ZSM-5 zeolite powder at a temperature of 400 to 600° C.; ion-exchanging the heat-treated zeolite powder with an alkali metal and impregnating the heat-treated zeolite powder with noble metal; heating the ion-exchanged, impregnated zeolite powder to a temperature of 250 to 350° C.; mixing the second heat-treated zeolite powder with a solid silica binder and a colloidal silica binder to form a mixture, wherein if the solid silica has a purity of less than or equal to 66 wt % of silica oxide based on the total weight of the solid silica, then the mixture is free of an extrusion aide and the colloidal silica has a particle size of less than 20 nm as measured along a major axis; forming the mixture into a shaped body; and heating the shaped body to 100 to 350° C. to result in the catalyst.

16 Claims, No Drawings

HYDROCARBON AROMATIZATION CATALYST COMPOSITION AND METHOD OF FORMATION

BACKGROUND

Descriptions of units, abbreviation, terminology, etc. used throughout the present disclosure are summarized in Table 1.

Zeolite is a crystalline hydrated aluminosilicate that can contain other metals in the framework of the zeolite crystal or that can be deposited, exchanged, or impregnated on the zeolite (i.e., on the surface or in the pores). A method for preparing a zeolite comprises (a) preparing an aqueous mixture of silicon oxide and sources of oxides of aluminum; and (b) maintaining said aqueous mixture under crystallization conditions until crystals of zeolite form. In the crystalline structure, there are pores and channels that may be interconnected. The dimensions and configuration of these pores and channels allow access by molecules of certain sizes. Zeolites are used as catalysts for, among other things, isomerization, toluene disproportionation, transalkylation, hydrogenation, alkane oligomerization, and aromatization. Aromatization is a multi-step process that can comprise the steps of dehydrogenation of the hydrocarbon, if the hydrocarbon is saturated, cyclization of the dehydrogenated hydrocarbon, and aromatization of the cyclized hydrocarbon.

One such example of hydrocarbon aromatization is aromatization of naphtha. Naphtha is a mixture mainly of straight-chained, branched, and cyclic aliphatic hydrocarbons, light naphtha having from five to nine carbon atoms per molecule and heavy naphtha having from seven to twelve carbon atoms per molecule. Typically, light naphtha contains naphthenes, such as cyclohexane and methylcyclopentane, and linear and branched paraffins, such as hexane and pentane. Light naphtha typically contains 60 to 99 wt % of paraffins and cycloparaffins. Light naphtha can be characterized as a petroleum distillate having a molecular weight range of 70 to 150 g/mol, a specific gravity range of 0.6 to 0.9 $g/cm^3$, a boiling point of 50 to 320° F. (10 to 160° C.), and a vapor pressure of 5 to 500 mmHg at room temperature. Light naphtha can be obtained from crude oil, natural gas condensate, or other hydrocarbon streams by a variety of processes, e.g., distillation.

Methods of forming shaped zeolite catalysts often result in reduced conversion and/or selectivity values for naphtha aromatization as compared to the corresponding powder catalyst. Improved methods for forming zeolite catalysts with one or both of improved selectivity and conversion for naphtha aromatization would therefore be desirable.

BRIEF SUMMARY

Disclosed herein are catalysts; methods for making and using the same.

In an embodiment a method for forming a catalyst, comprises: heating a Ge-ZSM-5 zeolite powder at a temperature of 400 to 600° C. to form a heat-treated zeolite powder; ion-exchanging the heat-treated zeolite powder with an alkali metal and impregnating the heat-treated zeolite powder with noble metal to form an ion-exchanged, impregnated zeolite powder; heating the ion-exchanged, impregnated zeolite powder to a temperature of 250 to 350° C. to form a second heat-treated zeolite powder; mixing the second heat-treated zeolite powder with a solid silica binder and a colloidal silica binder to form a mixture, wherein if the solid silica has a purity of less than or equal to 66 wt % of silica oxide based on the total weight of the solid silica, then the mixture is free of an extrusion aide and the colloidal silica has a particle size of less than 20 nm as measured along a major axis; forming the mixture into a shaped body; and heating the shaped body to 100 to 350° C. to result in the catalyst.

In another embodiment, a method for forming a catalyst comprises: heating a Ge-ZSM-5 zeolite powder at a temperature of 400 to 600° C. to form a heat-treated zeolite powder; ion-exchanging the heat-treated zeolite powder with cesium and impregnating the heat-treated zeolite powder with platinum to form a Cs—Pt/Ge-ZSM-5 zeolite powder; heating the Cs—Pt/Ge-ZSM-5 zeolite powder to a temperature of 250 to 350° C. to form a second heat-treated zeolite powder; mixing the second heat-treated zeolite powder with a solid silica binder and a colloidal silica binder to form a mixture, wherein, if the solid silica has a purity of less than or equal to 66 wt % of silica oxide based on the total weight of the solid silica, then the mixture is free of an extrusion aide and the colloidal silica has a particle size of less than 20 nm; forming the mixture into a shaped body; and heating the shaped body to 100 to 350° C. to form the catalyst; wherein after the silica binder is added, the zeolite is heated to a temperature not exceeding 350° C. prior to use in the hydrocarbon conversion reaction.

The above described and other features are exemplified by the following detailed description.

DETAILED DESCRIPTION

TABLE 1

| Abbreviation | Description |
|---|---|
| Å | Angstrom |
| ° C. | degree Celsius |
| C | carbon atom; (For example, $C_{7+}$ means seven or more carbon atoms) |
| Conv | conversion |
| ° F. | degree Fahrenheit |
| g | gram |
| $g/cm^3$ | gram per cubic centimeter |
| g/h | gram per hour |
| g/mol | gram per mole |
| GPC | gel permeation chromatography |
| h | hour |
| mmHg | millimeter of mercury |
| $m^2/g$ | meter square per gram |
| mol % | mole percent |
| M | molar |
| MW | weight average molecular weight |
| nm | nanometer |
| ppm | parts per million by weight |
| psia | pound per square inch absolute |
| SA | BET (Brunauer-Emmett-Teller) surface area |
| SAR | $SiO_2/Al_2O_3$ mole ratio |
| SCCM | standard cubic centimeter per minute |
| Sel | selectivity |
| vol % | volume percent |
| XRF | X-ray fluorescence |
| wt % | weight percent |

The present disclosure is directed to a method of forming a shaped catalyst that has similar or improved conversion values (i.e., +/−11%) for light naphtha aromatization as compared to a corresponding powder catalyst. The catalyst can be a germanium (Ge) substituted medium pore zeolite, which can be further modified to be non-acidic (for example by ion-exchanging with a base such as cesium), onto which a noble metal, such as platinum, can be deposited. The catalyst can be prepared by 1) heating a zeolite (also referred to as a zeolite powder) at a temperature of 400 to 600° C. in air for greater than or equal to 1 h to form a heat-treated zeolite (also referred to as a heat-treated zeolite powder); 2) ion-exchanging the heat-treated zeolite powder with an alkali metal and impregnating the heat-treated zeolite powder with noble metal to form an ion-exchanged, impregnated zeolite powder; 3) heating the ion-exchanged, impregnated zeolite (e.g., to a temperature of 250 to 350° C. in air) to form a second heat-treated zeolite powder (also referred to as a second heat-treated zeolite or a powder catalyst); 4) mixing the second heat-treated zeolite powder with a solid silica binder and a colloidal silica binder to form a forming mixture, wherein if the solid silica has a purity of less than or equal to 66 wt % of silica oxide based on the total weight of the solid silica, then the mixture is free of an extrusion aide and the colloidal silica has an average particle size (as measured along a major axis, i.e., the longest axis) of less than 20 nm, preferably, 7 to 15 nm); 5) forming the forming mixture into a shaped body (also referred to as a formed zeolite); and 6) heating the shaped body (e.g., 200 to 350° C. in air) to result in the final catalyst (also referred to as the catalyst). The heating steps 3) and/or 6) can further comprise heating the shaped body at a temperature of less than 600° C. (e.g., 300° C. to 600° C.) in a reducing environment (e.g., under flow of $H_2$).

The zeolite can be any of a number of zeolites, where zeolites are crystalline aluminosilicates with three-dimensional framework containing silica ($SiO_4$) and alumina ($AlO_4$) tetrahedra and can be naturally occurring or synthesized. In general, the zeolite framework contains channels and interconnected voids or pores, which can be occupied by cations and water molecules. Depending on the size and geometry of the pores and channels, zeolites can be classified as small, medium, or large pore zeolites, and also as one, two, or three-dimensional pore structure zeolites.

The zeolite can be from a family of pentasil zeolites that contain five membered ring units or pentasil units in the framework structure. Such zeolites include ZSM-5, ZSM-11, ZSM-23, and so on. Silicalite, which contains an isotypic framework of ZSM-5, can also be included. Preferably, the zeolite can be a pentasil zeolite, which contains 10-membered ring pore openings in the structure. Zeolites with the 10-membered pore openings are also known as medium pore zeolites. Examples of such pentasil zeolite containing 10-membered ring pore openings or medium pore are ZSM-5, ZSM-11, silicalite, etc.

The zeolite can be ZSM-5 also known as MFI (International Zeolite Association nomenclature of ZSM-5). The ZSM-5 zeolite has two-dimensional pore structure with straight channels (e.g., 5.4 Å×5.6 Å), which are intersected by sinusoidal channels (e.g., 5.1 Å×5.7 Å) with maximum diameter of about 9 Å at the intersection. The ZSM-5 zeolite catalysts and their preparation are described, for example, in U.S. Pat. No. 3,702,886. Such ZSM-5 zeolites are aluminosilicates that contain both silicon and aluminum in the crystalline structure. ZSM-11 is another pentasil aluminosilicate zeolite that is similar to ZSM-5.

The zeolite can have a $SiO_2/Al_2O_3$ mole ratio (SAR) of, for example, 25 to 1,000, preferably, 200 to 500, and more preferably, 200 to 400. The zeolite can have a SAR of greater than or equal to 40, e.g., 40 to infinity ($\infty$), preferably, 50 to 300. The zeolite can contain up to trace levels of other cations (wherein a trace level is less than or equal to 0.5 wt %, based upon the total weight of the zeolite).

The zeolite can be a germanium zeolite that includes silicon and germanium and optionally aluminum in the crystalline framework of the zeolite structure, for example, the germanium zeolite can be an aluminosilicate zeolite having germanium in the framework and can preferably be a germanium ZSM-5 (Ge-ZSM-5) zeolite. The germanium zeolite can comprise a medium pore zeolite having an average pore size of 5 to 7 Å, a SAR of 40 to infinity ($\infty$), and a germanium content of 0.1 to 10 wt %, preferably, 3.5 to 6.0 wt % based on the total weight of the final catalyst excluding any binder or extrusion aide.

The zeolite can be $H^+$ or $NH_4^+$ form and can contain no or trace amounts of alkali metal such as Na as $Na^+$. For example, the final catalyst can contain less than or equal to 0.5 wt % $Na_2O$, preferably, less than or equal to 0.05 wt % $Na_2O$, based on the total weight of the final catalyst excluding any binder or extrusion aide.

The zeolite can be prepared using a structure directing agent, which is incorporated in the microporous space of the crystalline network during crystallization, thus controlling the construction of the network and assisting to stabilize the structure through the interactions with, for example, the silicon and aluminum. Structure directing agents (also referred to as structure templating agents), such as tetraethylammonium ($TEA^+$), tetrapropylammonium ($TPA^+$), or other cations can be present in as-synthesized zeolite. Examples of the structure directing agent are organic amine and quaternary ammonium compounds and salts and cations thereof. The structure directing agent can comprise tetra n-propyl ammonium hydroxide, tetra n-propyl ammonium bromide, tetra n-propyl ammonium chloride, tetraethyl ammonium hydroxide, tetraethylammonium bromide, tetramethylammonium chloride, hexamethyleneimine, 1,4-di(1'4'-diazabicyclo[2.2.2]octane)butane hydroxide, morpholine, cyclohexylamine, diethylethanolamine, N,N'-diisopropyl imidazolium cation, tetrabutylammonium compounds, di-n-propylamine (DPA), tripropylamine, triethylamine (TEA), triethanolamine, piperidine, 2-methylpyridine, N,N-dimethylbenzylamine, N,N-diethylethanolamine, dicyclohexylamine, N,N-dimethylethanolamine, choline cation, N,N'-dimethylpiperazine, 1,4-diazabicyclo (2,2,2)octane, 1,6-hexanediamine, N',N',N,N-tetramethyl-(1,6)hexanediamine, N-methyldiethanolamine, N-methylethanolamine, N-methyl piperidine, 3-methyl-piperidine, N-methylcyclohexylamine, 3-methylpyridine, 4-methylpyridine, quinuclidine, N,N'-dimethyl-1,4-diazabicyclo(2,2,2)octane ion; di-n-butylamine, neopentylamine, di-n-pentylamine, isopropylamine, t-butyl-amine, ethylenediamine, pyrrolidine, 2-imidazolidone, a N-benzyl-1,4-diazabicyclo [2.2.2]octane cation, a 1-[1-(4-chlorophenyl)-cyclopropyl-methyl]-1-ethyl-pyrrolidinium cation, a 1-ethyl-1-(1-phenyl-cyclopropylmethyl)-pyrrolidium cation, 1,8-diaminooctane, or a combination comprising one or more of the foregoing. The structure directing agent can comprise tetra-n-propyl ammonium hydroxide (TPAOH)).

The structure directing agent can be removed, for example, by heating the zeolite at a temperature of 400 to 600° C., to result in a heat-treated zeolite that can subsequently be ion-exchanged. The heat-treated zeolite powder can be first base-exchanged with subsequent deposition of a noble metal or a noble metal can be deposited on the zeolite powder with a subsequent base-exchanging step.

The heat-treated zeolite can be base-exchanged with an alkali metal or alkaline earth metal, such as cesium, potassium, sodium, rubidium, barium, strontium, calcium, magnesium, lithium, and mixtures comprising at least one of the foregoing, e.g., to reduce acidity. Accordingly, the resultant catalyst can be non-acidic, where one meaning of the term "non-acidic" should be taken to mean a catalyst which has been base-exchanged. The heat-treated zeolite can be base-exchanged to the extent that most or all of the cations associated with aluminum are alkali metal or alkaline earth metal. An example of a monovalent base:aluminum molar ratio in the zeolite after base exchange is at least 0.9. The alkali metals and alkaline earth metals are non-framework metals. For example, if the alkaline earth metals and/or alkali metal(s) are present in the final catalyst, they can be present within the channels of the zeolite in the final catalyst, and not as part of the framework.

Likewise, the term "non-acidic" can mean an aluminum-free zeolite. An aluminum-free zeolite need not be base-exchanged to be non-acidic. The aluminum-free zeolite can contain another tetravalent or trivalent element, such as titanium, iron, gallium, boron, germanium, and/or tin. "Aluminum-free" zeolite has a meaning of having aluminum content of no more than 0.01 wt %. Within the meaning and for the purposes of the present disclosure, a zeolite can be "non-acidic" by ion-exchange with a base or by having a low aluminum content.

The heat-treated zeolite can be base-exchanged by contacting a solution comprising a base metal ion with the heat-treated zeolite. The solution can be a 0.01 to 1 M solution and it can contact (e.g., be mixed with or can be flowed over or passed through a bed of) the heat-treated zeolite for a sufficient amount of time to obtain the desired amount of base-exchange. For example, the heat-treated zeolite can be base-exchanged with cesium by making an aqueous slurry of zeolite powder, mixing with a solution comprising a water soluble cesium compound (such as cesium nitrate, cesium chloride, and the like) such that the amount of cesium in the final catalyst (as determined by XRF) is 3.0 to 7.0 wt %, preferably, 4.0 to 6.0 wt %, more preferably, 4.0 to 4.6 wt %, even more preferably, 4.0 to 4.5 wt % based on the total weight of the final catalyst excluding any binder or extrusion aide. In other words, the ion-exchanging can comprise ion-exchanging to obtain 3.0 to 7.0 wt %, preferably, 3.5 to 6.0 wt %, more preferably, 4.5 to 6.0 wt %, and even more preferably, 5.0 to 5.6 wt % Cs in the zeolite, based on the total weight of the final catalyst excluding any binder or extrusion aide.

A noble metal can be deposited on the heat-treated zeolite, for example by methods such as ion exchange, impregnation, and incipient wetness impregnation. The noble metal can be added to the heat-treated zeolite as a noble metal compound (e.g., a noble metal salt) that readily dissolves in water. For example, when the metal is platinum, the platinum source can be any applicable platinum source, such as chloroplatinic acid ($H_2PtCl_6 \cdot 6H_2O$), tetraamine platinum nitrate (($NH_3)_4Pt(NO_3)_2$), or a combination comprising at least one of the foregoing. The noble metal can be present in the final catalyst in an amount of 0.05 to 3 wt % (as measured by XRF), preferably, of 0.15 to 2 wt %, and more preferably, of 0.25 to 1.5 wt %, and even more preferably, of 0.4 to 1.0 wt % based on the total weight of the final catalyst excluding any binder or extrusion aide. The noble metal can be present in the catalyst in an amount of 0.8 to 1.1 wt % (as measured by XRF) based on the total weight of the final catalyst excluding any binder or extrusion aide. In other words, the process can comprise depositing to obtain 0.05 to 3 wt % (as measured by XRF), preferably, of 0.15 to 2 wt %, more preferably, of 0.25 to 1.5 wt %, and even more preferably, of 0.4 to 1.0 wt % platinum in the catalyst, based on the total weight of the final catalyst excluding any binder or extrusion aide. The noble metal can comprise palladium, silver, platinum, gold, iridium, rhodium, ruthenium, or a combination comprising one or more of the foregoing, preferably, the noble metal can comprise platinum.

The ion-exchanged, impregnated zeolite can then be heated, e.g., to a temperature of less than 600° C., preferably, to a temperature of 250 to 350° C. to form a second heat-treated zeolite.

The second heat-treated zeolite, preferably comprising a CsPt/Ge-ZSM-5 zeolite, can be mixed with a binder that can comprise a solid silica binder and a colloidal binder, an extrusion aid, or a combination comprising one or both of the foregoing to form a forming mixture.

The binder can comprise inorganic oxide materials. The binder can comprise an aluminum- or silicon-containing material such as silica, alumina, clay, aluminum phosphate, silica-alumina, or combinations comprising at least one of the foregoing. The binder can comprise a metal oxide, e.g., magnesium oxide, titanium oxide, zirconium oxide, thorium oxide, silicon oxide, and boron oxide; clay, e.g., kaolin and montmorillonite; carbon, e.g., carbon black, graphite, activated carbon, polymers, and charcoal; a metal carbide or nitride, e.g., molybdenum carbide, silicon carbide, and tungsten nitride; a metal oxide hydroxide, e.g., boehmite; or a combination comprising one or more of the foregoing. The binder can be a silica binder or a substantially silica containing binder, where the substantially silica containing binder means that the binder comprises 0.5 to 15 wt %, preferably, 1 to less than 5 wt %, more preferably, 1 to 4.5 wt % non-silica oxides based on the total weight of the final catalyst (including the binder and excluding any extrusion aide).

The binder can comprise at least one colloidal silica binder and at least one solid silica binder. The colloidal silica can be an $NH_4^+$ and/or $Na^+$ stabilized colloidal silica. Preferably, the colloidal silica can be an ammonium ion stabilized colloidal silica, such as, Ludox™ AS-30, Ludox™ AS-40, Ludox™ SM-30, Ludox™ HS-30, Nalco™ 1034A, available from Nalco Company, or those available from Sigma-Aldrich. The colloidal silica can comprise 30 to 40 wt % silica based on the total weight of the colloidal silica. The colloidal silica can have an average particle size of 1 to 30 nm, preferably, 7 to 15 nm. As used herein, particle size is measured along a major axis (i.e., the longest axis) of the particle.

The solid silica can comprise a crystalline silica, an amorphous silica, or a combination thereof. Examples of solid silica include attapulgite, e.g., Min-U-Gel™ commercially available from Active Minerals International, Ultrasil™ commercially available from Degussa Corporation, and Davisil™-643 commercially available from Sigma-Aldrich. The solid silica can have an average particle size of 5 to 30 nm. The solid silica can comprise a high purity solid silica, where 'high purity solid silica' is a solid silica that comprises greater than or equal to 70 wt %, preferably, greater than or equal to 80 wt %, more preferably, greater than or equal to 90 wt % of silica oxide, based on the total weight of the solid silica. If a low purity solid silica, such as one that comprises less than 70 wt %, preferably, less than or equal to 66 wt % of silica oxide based on the total weight of the low purity solid silica, is present in the binder, then the colloidal binder should have a particle size of 5 to 20 nm, more preferably, 7 to 15 nm and the forming mixture should be free on an extrusion aide.

The binder can comprise at least one solid binder and a mixture of colloidal binders. For example, the mixture of colloidal binders can include at least 10 wt % of a colloidal binder based on the total weight of the mixture of colloidal binders having an average particle size of 10 to 30 nm, while the remaining colloidal binders can, for example, have an average particle size of 1 to 30 nm. Likewise, the mixture of colloidal binders can comprise at least 20 wt % of a colloidal binder based on the total weight of the mixture of colloidal binders having an average particle size of 10 to 30 nm, while the remaining binders can have an average particle size of 5 to 10 nm. The colloidal binder can have an average surface area of less than or equal to 250 m²/g, preferably, 250 to 100 m²/g.

The binder can be present in the final catalyst in an amount of up to 99 wt %, e.g., 1 to 99 wt %, preferably, 10 to 60 wt %, based on the total weight of the final catalyst. The final catalyst can comprise 15 to 50 wt %, preferably, 20 to 40 wt % of silica-containing binder material, based on the total weight of the final catalyst.

The extrusion aide can comprise a partially hydrolyzed polyvinyl alcohol and can be produced commercially by hydrolysis of polyvinyl acetate. When polyvinyl acetate is hydrolyzed, the acetate groups (—COCH$_3$) are substituted by hydrogen to form alcohol (—OH) groups along the polymer chain. Hereinafter, the term 'partially hydrolyzed' refers to a polyvinyl acetate that has been hydrolyzed by less than or equal to 90%. In the partially hydrolyzed polyvinyl alcohol, acetate and alcohol groups are randomly distributed in the polymer chain. The partially hydrolyzed polyvinyl alcohol can have a MW of 500 to 500,000 g/mol, preferably, 10,000 to 200,000 g/mol as measured by GPC such as those commercially available from SIGMA-ALDRICH™. The partially hydrolyzed polyvinyl alcohol can be used in an amount of 0.1 to 5 wt %, preferably, 0.5 to 3 wt %, more preferably, 1 to 2 wt %, based on the total weight of the forming mixture.

The extrusion aide can comprise polyacrylamide. The polyacrylamide can have a MW of 2 to 10 million g/mol, preferably, 2 to 7 million g/mol. The polyacrylamide can be used in an amount of 0.1 to 5 wt %, preferably, 0.5 to 3 wt %, more preferably, 1 to 2 wt %, based on the total weight of the forming mixture. An example of a commercially available source of polyacrylamide is that sold under the trademark CYFLOC™ N-300 LMW Flocculant available from Cytec, West Paterson, N.J., which is a polyacrylamide having a MW of 2 to 5 million g/mol.

The forming mixture can be formed into a shaped body (also referred to as a formed zeolite) by various forming processes such as pelletizing, tableting, extruding, and any other technique of forming the forming mixture into a shape, as well as a combination comprising at least one of the foregoing processes. The resulting shaped body can be, for example, pellets and/or tablets. The shaped body can have cross-sections that are, for example, circular, oval, oblong, square, rectangular, diamond, polygonal, or a combination comprising one or more of the foregoing. Specific examples include cylindrically shaped extrudates, such as 1/16 inch (1.6 mm) or 1/8 inch (3.2 mm) cylindrically shaped extrudates. The forming can be performed at temperatures of less than or equal to 350° C.

After the forming mixture is formed into a shaped body, the shaped body can be calcined in an oxygen containing environment at a temperature not exceeding 350° C. and/or activated at a temperature less than 600° C. in a reducing environment (e.g., under flow of H$_2$) to result in the final catalyst. The shaped body can be heated in an oxygen containing environment to a temperature of 100 to 350° C. for greater than or equal to 0.5 h, preferably, greater than or equal to 1 h, more preferably, greater than or equal to 2 h. The shaped body can be heated in an oxygen containing environment for 0.5 to 20 h.

The final catalyst can concurrently function as one or more of an isomerization, a cracking, a dehydrogenation, a dehydrocyclization, and an aromatization catalyst. Preferably, the catalyst can be used in a process of aromatization of alkanes, such as alkanes having six to twelve carbon atoms per molecule, to produce aromatics, such as benzene, ethyl benzene, toluene, and xylene. The contact between the alkane and the catalyst can be at a liquid hourly space velocity of 0.1 to 100 l/h, at a temperature of 200 to 950° C., preferably, 425 to 650° C., more preferably, 450 to 625° C., even more preferably, 475 to 550° C., at a pressure of 5 to 315 psia. The feedstream to the reactor containing the catalyst can comprise greater than or equal to 30 vol % paraffins (e.g., greater than or equal to 50 vol % paraffins), and low, (i.e., less than or equal to 20 vol %, or even less than or equal to 10 vol %) naphthenes. The feedstream to the reactor can comprise hydrocarbons having any ratio of paraffin and naphthene hydrocarbons. The feedstream can comprise $C_{1-12}$ hydrocarbons, preferably, $C_{6-12}$ hydrocarbons, more preferably, $C_{6-8}$ hydrocarbons, more preferably, $C_{6-8}$ alkanes, either alone or as components in a mixture, i.e., in an amount of 0 to 100 vol % for each of $C_6$, $C_7$, and $C_8$ alkane.

The feedstream can be a naphtha feed. The naphtha feed can be a refinery product comprising greater than or equal to 25 wt %, preferably, greater than or equal to 35 wt %, more preferably, greater than or equal to 50 wt % of $C_{5-9}$ aliphatic and cycloaliphatic hydrocarbons, such as olefins and paraffins, and zero to 40 wt % $C_{6-13}$ aromatics (e.g., zero to 20 wt % $C_{6-13}$ aromatics). The naphtha feed can comprise up to 1,000 ppm sulfur, preferably, 1 to 500 ppm sulfur, more preferably, 1 to 250 ppm sulfur, even more preferably, 1 to 50 ppm sulfur, where the term sulfur refers to elemental sulfur as well as sulfur compounds such as organosulfides or heterocyclic benzothiophenes. The naphtha feed can comprise up to 100 ppm of nitrogen compounds. Aliphatic hydrocarbons that can be present in the naphtha feed include n-hexane, 2-methylpentane, 3-methylpentane, n-heptane, 2-methylhexane, 3-methylhexane, 3-ethylpentane, 2,5-dimethyl hexane, n-octane, 2-methylheptane, 3-ethylhexane, n-nonane, 2-methyloctane, 3-methyloctane, n-decane, the corresponding $C_{5-9}$ cycloparaffins, and combinations comprising one or more of the foregoing.

The catalyst can have similar conversion values (i.e., +1-11%) for light naphtha aromatization as the corresponding powder catalyst. The catalyst can result in a conversion of n-hexane to benzene of greater than or equal to 16.8 mol %, preferably, greater than 18.8 mol % at 50 h on stream.

The following examples are provided to illustrate the present catalyst. The examples are merely illustrative and are not intended to limit devices made in accordance with the disclosure to the materials, conditions, or process parameters set forth therein.

EXAMPLES

The materials used in the following examples are described in Table 2.

TABLE 2

| Component | Source |
| --- | --- |
| Ge-ZSM-5$^a$ (powder form) | Sud-Chemie |
| CsNO$_3$ | Sigma Aldrich |

TABLE 2-continued

| Component | Source |
|---|---|
| $(NH_3)_4Pt(NO_3)_2$ | Sigma Aldrich |
| Colloidal silica 1: Ludox ™ AS-30 (30 wt % $SiO_2$ in aqueous solution); particle size 12 nm, surface area 217 $m^2/g$ | Sigma Aldrich |
| Colloidal silica 2: Ludox ™ AS-40 (40 wt % $SiO_2$ in aqueous solution); particle size 20-24 nm, surface area 143 $m^2/g$ | Sigma Aldrich |
| Solid silica 1: Ultrasil, 99 wt % $SiO_2$ | Evonik |
| Solid silica 2: Min-U-Gel ™, 66 wt % $SiO_2$ (see analysis below)[b] | Active Minerals Intl. |
| Aide 1: Polyacrylamide extrusion aide (Cyfloc ™ N-300 LMW, MW 2-5 million g/mol) | Cytec |
| n-Hexane (reagent grade, 99%+) | Sigma Aldrich |
| Water (deionized) | SABIC labs |

[a]As-synthesized (containing template); elemental analysis (by XRF method), Si = 38.08 wt %, Al = 0.69 wt %, Ge = 5.83 wt %, Na = 0.22 wt %, Si/$Al_2$ = 106.03, Si/$Ge_2$ = 33.76, Si/($Al_2$ + $Ge_2$) = 25.61.
[b]Min-U-Gel, Composition: (wt %): 66% $SiO_2$, 11.71% $Al_2O_3$, 9.70% MgO, 4.02% $Fe_2O_3$, 0.55% $TiO_2$, 0.99% $P_2O_5$, 2.92% CaO, 1.07% $K_2O$, 2.57% $CO_2$, 0.25% $SO_4$.

Catalyst Synthesis

Catalysts used in the present application are divided into 9 groups based on the materials used for forming. The catalysts of Group 1 are Catalysts 1-1 to 1-3 (it is noted that catalyst nomenclature is that the number before the dash is the group number and the number after the dash is the catalyst number within the before listed group) and contain no binder and were not formed. In other words, the ion-exchanged, impregnated zeolite was not added to a forming mixture and formed into a shaped body. These catalysts are referred as powder catalysts. The catalysts of Groups 2-9 are formed catalysts, where ion-exchanged, impregnated zeolite was added to a forming mixture comprising different solid silica and colloidal silica binders as described below and that were subsequently formed. Extrusion aide was used in the mixture, where stated.

The Group 1 catalysts, Catalysts 1-1 to 1-3, are powder CsPt/Ge-ZSM-5 catalysts. Specifically, as synthesized Ge-ZSM-5 zeolite powder was calcined at 530° C. in air for about 10 h to remove the structure directing agent. The calcined Ge-ZSM-5 was then ion-exchanged with 0.5 M aqueous solution of $CsNO_3$ at 100° C. for 2 h and then washed with deionized water. The Cs exchange was repeated and was then calcined in air at 300° C. Pt was impregnated into the Cs exchanged Ge-ZSM-5 powder with an aqueous solution of $(NH_3)_4Pt(NO_3)_2$ containing 1.0 wt % Pt using a wet-incipient method and the resulting solid was calcined in air at 300° C. for 10 h to form the powder catalyst. The powder catalyst was then pressed into tablets and then sized (20-40 mesh) for use for n-hexane aromatization.

Table 3 shows elemental analysis (by XRF) and the BET surface area (SA) by N2 adsorption of Catalysts 1-1 to 1-3. Table 3 shows that the powder catalysts comprised a Cs content of 5.0 to 5.6 wt % and a Pt content of 0.8 to 1.0 wt %, where the Cs and Pt contents as determined by XRF analysis are based on the total weight of the powder catalyst.

The catalysts of Groups 2-9 were formed into shaped bodies, where extrudable mixtures containing the powder catalyst of Group 1, solid silica, colloidal silica, and extrusion aide, where noted, were extruded into ⅛ inch diameter cylinder shaped extruded catalysts, see Tables 4-8. The shaped catalysts were heated at 300° C. in air. It is noted that Catalysts 3-2, 7-4, and 7-6 were recalcined under flow of diluted $H_2$ at 550° C. (see Tables 4 and 6).

The catalysts were then tested for light naphtha aromatization, where the catalysts were used for conversion of n-hexane to benzene under aromatization conditions. For comparison of the catalytic performance of each of the catalysts of Groups 1-9, a fixed load of 0.127 g of fresh, active catalyst was used for each test run. (In the present application, the active catalyst refers to the amount of powder zeolite catalyst (CsPt/Ge-ZSM-5) present in the final catalyst. For example, if a catalyst contains 30 wt % binder then 0.127/(1-0.30) g or 0.181 g of the formed catalyst was loaded.) After loading and pressure testing, the testing unit was heated up to a temperature of 200° C. for 1 hour. A hydrogen gas flow of 25 SCCM was divided across the five reactor tubes. The temperature was then raised to 460° C. for 1 hour under the same hydrogen flow. Next, reagent grade n-hexane (99%+) was added at a flow rate of 7.14 g/h divided across the five reactors and the temperature raised to a temperature of 515° C. Reactor effluent was analyzed to determine the n-hexane conversion and selectivity. Conversion was defined as the fraction of n-hexane feed converted to benzene, $C_{1-5}$ products, and $C_{7+}$ products. Selectivity was defined as the sum of the amounts of benzene, toluene, and xylenes produced divided by the amount of feed converted to benzene, $C_{1-5}$ products, and $C_{7+}$ products. The resulting conversion and selectivity in mole percent (mol %) are shown in Tables 3-7. The conversions (Cony) and selectivities (Sel) reported in this disclosure are at 50 h run time.

Table 3 shows the conversion and selectivity for powder catalysts of Group 1.

TABLE 3

| Catalyst | Elemental Analysis, wt % | | | | | SA, $m^2/g$ | % Conv at 50 h | % Sel at 50 h |
|---|---|---|---|---|---|---|---|---|
| | Si | Al | Ge | Cs | Pt | | | |
| 1-1 | 39.28 | 0.71 | 4.71 | 5.43 | 0.87 | — | 18.0 | 90.8 |
| 1-2* | 39.92 | 0.72 | 4.68 | 5.03 | 0.95 | 312 | 19.2 | 93.1 |
| 1-3 | 39.74 | 0.72 | 4.64 | 5.58 | 0.80 | — | 19.2 | 93.0 |

*Composite of multiple batches to make 2.7 kg.

Table 4 shows the conversion and selectivity data for the Group 2 and Group 3 catalysts that were formed with solid silica 1 and colloidal silica 1, where the Group 2 catalysts were formed without an extrusion aide and the Group 3 catalysts were formed with an extrusion aide.

TABLE 4

| | Material Used for Catalyst Formation (g)[1] | | | | | | | |
|---|---|---|---|---|---|---|---|---|
| Catalyst | Zeolite[2] | Solid silica 1 | Colloidal silica 1 | Aide 1 | % Binder | SA, $m^2/g$ | % Conv at 50 h | % Sel at 50 h |
| 2-1 | 39.6 | 3.5 | 38.2 | None | 27.3 | 283.2 | 18.3 | 93.1 |
| 2-2 | 39.6 | 3.5 | 38.2 | None | 27.3 | 283.2 | 19.9 | 93.2 |
| 2-3 | 40.1 | 6.0 | 39.2 | None | 30.6 | — | 19.8 | 93.5 |
| 3-1 | 39.6 | 3.5 | 38.4 | 0.80 | 27.4 | 284.8 | 16.5 | 93.5 |
| 3-2[3] | 39.6 | 3.5 | 38.4 | 0.80 | 27.4 | 287.2 | 16.9 | 93.7 |

TABLE 4-continued

| Catalyst | Zeolite[2] | Solid silica 1 | Colloidal silica 1 | Aide 1 | % Binder | SA, m²/g | % Conv at 50 h | % Sel at 50 h |
|---|---|---|---|---|---|---|---|---|
| 3-3[4] | 800.0 | 120.8 | 780.0 | 16.8 | 30.5 | 276.7 | 16.9 | 92.0 |
| 3-4[5] | 800.0 | 120.8 | 780.0 | 16.8 | 30.5 | 281.4 | 16.8 | 94.4 |

[1]As-received material used;
[2]Zeolite used are CsPt/Ge-ZSM-5 described earlier (Group 1 catalyst);
[3]Recalcined catalyst 3-1 under 5% H₂ flow (balance N₂) at 550° C.;
[4]Calcined at 315° C.;
[5]Calcined at 300° C.

Table 5 shows the conversion and selectivity data for the Group 4 and Group 5 catalysts that were formed with solid silica 1 and colloidal silica 2, where the Group 4 catalysts were formed without an extrusion aide and the Group 5 catalysts were formed with an extrusion aide.

TABLE 5

| Catalyst | Zeolite[2] | Solid silica 1 | Colloidal silica 2 | Aide 1 | % Binder | SA, m²/g | % Conv at 50 h | % Sel at 50 h |
|---|---|---|---|---|---|---|---|---|
| 4-1 | 35.0 | 10.2 | 39.2 | None | 42.2 | 234.0 | 19.0 | 93.5 |
| 4-2 | 35.1 | 15.4 | 60.9 | None | 52.8 | 213.8 | 18.3 | 93.8 |
| 4-3 | 195.2 | 56.9 | 218.3 | None | 42.2 | - | 18.4 | 93.5 |
| 4-4 | 40.0 | 3.4 | 34.3 | None | 30.0 | 263.8 | 19.4 | 93.4 |
| 4-5 | 40.0 | 1.5 | 39.0 | None | 30.2 | 262.9 | 20.7 | 92.6 |
| 4-6 | 40.0 | 2.9 | 35.6 | None | 30.1 | 259.2 | 18.3 | 93.2 |
| 4-7 | 60.1 | 5.1 | 51.4 | None | 29.9 | 258.6 | 19.5 | 93.4 |
| 4-8 | 40.1 | 3.4 | 40.8 | None | 33.1 | 253.2 | 18.5 | 93.2 |
| 5-1 | 50.0 | 7.6 | 37.0 | 1.1 | 30.7 | 258.4 | 17.3 | 91.9 |
| 5-2 | 35.0 | 10.2 | 39.3 | 0.7 | 42.2 | — | 17.7 | 93.2 |

[1]As-received material used;
[2]Zeolite used is the CsPt/Ge-ZSM-5 described above (Group 1 catalyst).

Table 6 shows the conversion and selectivity data for the Group 6 and Group 7 catalysts that were formed with solid silica 2 and colloidal silica 1, where the Group 6 catalysts were formed without an extrusion aide and the Group 7 catalysts were formed with an extrusion aide.

TABLE 6

| Catalyst | Zeolite[2] | Solid silica 2 | Colloidal silica 1 | Aide 1 | % Binder | SA, m²/g | % Conv at 50 h | % Sel at 50 h |
|---|---|---|---|---|---|---|---|---|
| 6-1 | 40.0 | 2.2 | 32.8 | None | 23.7 | 283.4 | 19.1 | 92.3 |
| 6-2 | 40.1 | 2.2 | 32.5 | None | 23.1 | 285.0 | 17.1 | 91.9 |
| 6-3 | 40.1 | 6.0 | 39.0 | None | 30.0 | 281.7 | 17.1 | 93.2 |
| 7-1[3] | 800 | 120.8 | 520 | 16.8 | 24.8 | 283.7 | 9.7 | 88.2 |
| 7-2[4] | 800 | 120.8 | 520 | 16.8 | 24.8 | 277.0 | 9.8 | 88.5 |
| 7-3 | 40.0 | 6.0 | 38.8 | 0.84 | 30.0 | 276.0 | 12.2 | 90.2 |
| 7-4[5] | 40.0 | 6.0 | 38.8 | 0.84 | 30.0 | 280.0 | 10.8 | 91.2 |
| 7-5 | 40.1 | 6.0 | 38.3 | 0.84 | 29.8 | 279.7 | 11.7 | 89.9 |
| 7-6[6] | 40.1 | 6.0 | 38.3 | 0.84 | 29.8 | 280.4 | 10.8 | 91.0 |
| 7-7[7] | 40.0 | 6.0 | 38.6 | 0.84 | 29.9 | 284.0 | 15.1 | 91.0 |
| 7-8 | 40.0 | 6.0 | 38.6 | 0.84 | 29.9 | 282.2 | 12.9 | 90.3 |
| 7-9 | 40.0 | 6.0 | 39.0 | 0.84 | 30.1 | 280.4 | 12.5 | 90.8 |

[1]As-received material used;
[2]Zeolite used is the CsPt/Ge-ZSM-5 described earlier (Group 1 catalyst);
[3]Catalyst calcined at 315° C.;
[4]Catalyst calcined at 300° C.;
[5]Recalcined catalyst 7-3 under 5% H₂ (balance N₂) flow;
[6]Recalcined catalyst 7-5 under 5% H₂ (balance N₂) flow;
[7]Not extruded but hand-rolled.

Table 7 shows the conversion and selectivity data for the Group 8 and Group 9 catalysts that were formed with solid silica 2 and colloidal silica 2, where the Group 8 catalysts were formed without an extrusion aide and the Group 9 catalysts were formed with an extrusion aide.

TABLE 7

| Catalyst | Material Used for Catalyst Formation (g)[1] | | | | % Binder | SA, $m^2/g$ | % Conv at 50 h | % Sel at 50 h |
|---|---|---|---|---|---|---|---|---|
| | Zeolite[2] | Solid silica 2 | Colloidal silica 2 | Aide 1 | | | | |
| 8-1 | 40.0 | 3.1 | 37.1 | None | 30.8 | 253.0 | 13.9 | 92.4 |
| 8-2 | 40.0 | 3.1 | 37.1 | None | 30.8 | 253.0 | 14.6 | 92.0 |
| 9-1 | 40.1 | 3.0 | 37.6 | 0.81 | 30.7 | 262.0 | 15.2 | 92.2 |
| 9-2 | 40.1 | 3.0 | 37.6 | 0.81 | 30.7 | 258.9 | 14.6 | 93.1 |

[1]As-received material used;
[2]Zeolite used are CsPt/Ge-ZSM-5 described earlier (Group 1 catalyst);

Examples 1-9

Table 8 shows the averaged conversion and averaged selectivity values of the catalysts of Groups 1-9 for comparison. The ranges of binder in weight percent are also provided.

TABLE 8

| | Catalyst Group | | | | | | | | |
|---|---|---|---|---|---|---|---|---|---|
| | 1 | 2 | 3 | 4 | 5 | 6 | 7 | 8 | 9 |
| Reference Table | 3 | 4 | 4 | 5 | 5 | 6 | 6 | 7 | 7 |
| Colloidal silica | — | 1 | 1 | 2 | 2 | 1 | 1 | 2 | 2 |
| Solid silica | — | 1 | 1 | 1 | 1 | 2 | 2 | 2 | 2 |
| Extrusion aide | — | — | 1 | — | 1 | — | 1 | — | 1 |
| Binder (wt %) | — | 27-31 | 27-31 | 30-53 | 30-42 | 23-30 | 25-30 | 31 | 31 |
| Conversion (mol %) | 18.8 | 19.3 | 16.8 | 19.0 | 17.5 | 17.8 | 11.7 | 14.3 | 14.9 |
| Selectivity (mol %) | 92.3 | 93.3 | 93.4 | 93.3 | 92.6 | 92.5 | 92.5 | 92.2 | 92.7 |

Table 8 shows that the powder Catalysts of Group 1 containing no binder show an average conversion of 18.8%. Catalysts of Groups 2-5, that contain high purity solid silica (Ultrasil $SiO_2$) in the binder, all resulted in average conversion values between 16.8 and 19.3 mol % similar to or better than the conversion values of the powder Catalyst of Group 1. Catalysts of Group 6 that contained colloidal silica (Ludox AS-30) with a particle size of 12 nm, a low purity solid silica (MUG) binder, and no extrusion aide also resulted in a conversion value (17.8 mol %) similar to that of the powder Catalyst of Group 1. The catalysts of Groups 2-6 show conversions within +/−11% of the powder catalyst. Catalysts of Groups 7-9 that contained the low purity solid silica binder (MUG), a colloidal silica (AS-40) with a particle size of 20-24 nm, and where the catalysts of Groups 7 and 9 further comprise an extrusion aide resulted in average conversion values between 11.7 and 14.9 mol %.

Set forth below are some embodiments of the present catalyst, and methods of making and using the catalyst.

Embodiment 1

A method for forming a catalyst, comprising: heating a Ge-ZSM-5 zeolite powder at a temperature of 400 to 600° C. to form a heat-treated zeolite powder; ion-exchanging the heat-treated zeolite powder with an alkali metal and impregnating the heat-treated zeolite powder with noble metal to form an ion-exchanged, impregnated zeolite powder; heating the ion-exchanged, impregnated zeolite powder to a temperature of 250 to 350° C. to form a second heat-treated zeolite powder; mixing the second heat-treated zeolite powder with a solid silica binder and a colloidal silica binder to form a mixture, wherein if the solid silica has a purity of less than or equal to 66 wt % of silica oxide based on the total weight of the solid silica, then the mixture is free of an extrusion aide and the colloidal silica has a particle size of less than 20 nm as measured along a major axis; forming the mixture into a shaped body; and heating the shaped body to 100 to 350° C. to result in the catalyst.

Embodiment 2

The method of Embodiment 1, wherein the heating the ion-exchanged, impregnated zeolite powder and/or the heating the shaped body further comprises heating at a temperature of less than 600° C. in a reducing environment.

Embodiment 3

The method of any of Embodiments 1-2, wherein alkali metal comprises at least one of Na, K, Rb, and Cs.

Embodiment 4

The method of any of Embodiments 1-3, wherein alkali metal comprises Cs.

Embodiment 5

The method of any of Embodiments 1-4, wherein the zeolite is non-acidic.

Embodiment 6

The method of Embodiment 5, wherein a monovalent base to aluminum molar ratio in the zeolite after base exchange is greater than or equal to 0.9.

Embodiment 7

The method of any of Embodiments 1-6, wherein the solid silica comprises greater than or equal to 70 wt % of silica oxide.

Embodiment 8

The method of any of Embodiments 1-7, wherein the colloidal silica has a particle size of 7 to 15 nm.

Embodiment 9

The method of any of Embodiments 1-8, wherein the mixture comprises the extrusion aide.

Embodiment 10

The method of any of Embodiments 1-8, wherein the mixture is free of the extrusion aid.

Embodiment 11

The method of any of Embodiments 1-10, wherein the shaped body contains less than 5 wt % non-silica oxides, based upon a total weight of the formed catalyst.

Embodiment 12

The method of any of Embodiments 1-11, wherein the noble metal comprises platinum.

Embodiment 13

The method of any of Embodiments 1-12, wherein the catalyst comprises 0.5 to 3 wt % platinum based on the total weight of the catalyst.

Embodiment 14

The method of any of Embodiments 1-13, wherein the catalyst comprises 3.0 to 7.0 wt % Cs.

Embodiment 15

The method of any of Embodiments 1-14, wherein after the silica binder is added, the zeolite is heated to a temperature not exceeding 350° C. prior to use in a hydrocarbon conversion reaction.

Embodiment 16

The method of any of Embodiments 1-15, further comprising heating in a reducing environment at a temperature of less than 600° C. the ion-exchanged, impregnated zeolite powder and/or heating the shaped body.

Embodiment 17

A method for forming a catalyst comprising: heating a Ge-ZSM-5 zeolite powder at a temperature of 400 to 600° C. to form a heat-treated zeolite powder; ion-exchanging the heat-treated zeolite powder with cesium and impregnating the heat-treated zeolite powder with platinum to form a Cs—Pt/Ge-ZSM-5 zeolite powder; heating the Cs—Pt/Ge-ZSM-5 zeolite powder to a temperature of 250 to 350° C. to form a second heat-treated zeolite powder; mixing the second heat-treated zeolite powder with a solid silica binder and a colloidal silica binder to form a mixture, wherein, if the solid silica has a purity of less than or equal to 66 wt % of silica oxide based on the total weight of the solid silica, then the mixture is free of an extrusion aide and the colloidal silica has a particle size of less than 20 nm; forming the mixture into a shaped body; and heating the shaped body to 100 to 350° C. to form the catalyst; wherein after the silica binder is added, the zeolite is heated to a temperature not exceeding 350° C. prior to use in the hydrocarbon conversion reaction.

Embodiment 18

A catalyst formed by the method of any of Embodiments 1-17.

Embodiment 19

A process for the conversion of hydrocarbons, comprising: a) contacting a hydrocarbon stream containing alkanes, olefins, or a mixture thereof having 2 to 12 carbon atoms per molecule with the catalyst of Embodiment 18, b) converting the hydrocarbon stream into a product; and c) recovering the product.

Embodiment 20

The process of Embodiment 19, wherein the converting comprises one or more of isomerizing, a cracking, a dehydrogenating, a dehydrocyclizing, and aromatizing.

Embodiment 21

The process of Embodiment 20, wherein the hydrocarbon stream comprises alkanes, olefins, or a mixture thereof having 6 to 12 carbon atoms per molecule and wherein the converting comprises aromatizing.

Embodiment 22

The process of any of Embodiments 19-21, wherein the product comprises benzene, ethyl benzene, toluene, xylene, or a combination comprising one or more of the foregoing.

In general, the invention can alternately comprise, consist of, or consist essentially of, any appropriate components herein disclosed. The invention can additionally, or alternatively, be formulated so as to be devoid, or substantially free, of any components, materials, ingredients, adjuvants or species used in the prior art compositions or that are otherwise not necessary to the achievement of the function and/or objectives of the present invention.

All ranges disclosed herein are inclusive of the endpoints, and the endpoints are independently combinable with each other (e.g., ranges of "up to 25 wt %, or, more preferably, 5 to 20 wt %", is inclusive of the endpoints and all intermediate values of the ranges of "5 to 25 wt %," etc.). "Combination" is inclusive of blends, mixtures, alloys, reaction products, and the like. Furthermore, the terms "first," "second," and the like, herein do not denote any order, quantity, or importance, but rather are used to denote one element from another. The terms "a" and "an" and "the" herein do not denote a limitation of quantity, and are to be construed to cover both the singular and the plural, unless otherwise indicated herein or clearly contradicted by context. The suffix "(s)" as used herein is intended to include both the singular and the plural of the term that it modifies, thereby including one or more of that term (e.g., the film(s) includes one or more films). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

Unless defined otherwise, technical and scientific terms used herein have the same meaning as is commonly understood by one of skill in the art to which this invention belongs. As used herein, the term "hydrocarbyl" and "hydrocarbon" refers broadly to a substituent comprising carbon and hydrogen, optionally with 1 to 3 heteroatoms, for example, oxygen, nitrogen, halogen, silicon, sulfur, or a combination thereof.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

Disclosure of a narrower range in addition to a broader range is not a disclaimer of the broader range.

Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group. In addition, it is to be understood that the described elements may be combined in any suitable manner in the various embodiments. The term "substituted" as used herein means that at least one hydrogen on the designated atom or group is replaced with another group, provided that the designated atom's normal valence is not exceeded.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

We claim:

1. A method for forming a catalyst, comprising:
   heating a Ge-ZSM-5 zeolite powder at a temperature of 400 to 600° C. to form a heat-treated zeolite powder;
   ion-exchanging the heat-treated zeolite powder with an alkali metal and impregnating the heat-treated zeolite powder with noble metal to form an ion-exchanged, impregnated zeolite powder;
   heating the ion-exchanged, impregnated zeolite powder to a temperature of 250 to 350° C. to form a second heat-treated zeolite powder;
   mixing the second heat-treated zeolite powder with a solid silica binder and a colloidal silica binder to form a mixture, wherein the solid silica has a purity of less than or equal to 66 wt % of silica oxide based on the total weight of the solid silica, the mixture is free of an extrusion aide, and the colloidal silica has a particle size of less than 20 nm as measured along a major axis;
   forming the mixture into a shaped body; and
   heating the shaped body to 100 to 350° C. to result in the catalyst.

2. The method of claim 1, wherein the heating the ion-exchanged, impregnated zeolite powder and/or the heating the shaped body further comprises heating at a temperature of less than 600° C. in a reducing environment.

3. The method of claim 1, wherein alkali metal comprises at least one of Na, K, Rb, and Cs.

4. The method of claim 1, wherein the zeolite is non-acidic.

5. The method of claim 4, wherein a monovalent base to aluminum molar ratio in the zeolite after base exchange is greater than or equal to 0.9.

6. The method of claim 1, wherein the colloidal silica has a particle size of 7 to 15 nm.

7. The method of claim 1, wherein the shaped body contains less than 5 wt % non-silica oxides, based upon a total weight of the formed catalyst.

8. The method of claim 1, wherein the noble metal comprises platinum.

9. The method of claim 1, wherein the catalyst comprises 0.5 to 3 wt % platinum, based on the total weight of the catalyst.

10. The method of claim 1, wherein the catalyst comprises 3.0 to 7.0 wt % Cs, based on the total weight of the catalyst.

11. The method of claim 1, further comprising heating in a reducing environment at a temperature of less than 600° C. the ion-exchanged, impregnated zeolite powder and/or heating the shaped body.

12. A method for forming a catalyst comprising:
    heating a Ge-ZSM-5 zeolite powder at a temperature of 400 to 600° C. to form a heat-treated zeolite powder;
    ion-exchanging the heat-treated zeolite powder with cesium and impregnating the heat-treated zeolite powder with platinum to form a Cs—Pt/Ge-ZSM-5 zeolite powder;
    heating the Cs—Pt/Ge-ZSM-5 zeolite powder to a temperature of 250 to 350° C. to form a second heat-treated zeolite powder;
    mixing the second heat-treated zeolite powder with a solid silica binder and a colloidal silica binder to form a mixture, wherein,
       the solid silica has a purity of less than or equal to 66 wt % of silica oxide based on the total weight of the solid silica, the mixture is free of an extrusion aide, and the colloidal silica has a particle size of less than 20 nm as measured along a major axis;
    forming the mixture into a shaped body; and
    heating the shaped body to 100 to 350° C. to form the catalyst;
    wherein after the silica binder is added, the zeolite is heated to a temperature not exceeding 350° C. prior to use in the hydrocarbon conversion reaction.

13. A catalyst formed by the method of claim 1.

14. A process for the conversion of hydrocarbons, comprising:
    a) contacting a hydrocarbon stream containing alkanes, olefins, or a mixture thereof having 2 to 12 carbon atoms per molecule with the catalyst of claim 13;
    b) converting the hydrocarbon stream into a product; and
    c) recovering the product.

15. The process of claim 14, wherein the converting comprises one or more of isomerizing, a cracking, a dehydrogenating, a dehydrocyclizing, and aromatizing.

16. The process of claim 15, wherein the hydrocarbon stream comprises alkanes, olefins, or a mixture thereof having 6 to 12 carbon atoms per molecule and wherein the converting comprises aromatizing.

* * * * *